July 24, 1923.  
J. F. PATTERSON  
1,462,817  
SHOCK COMPRESSING AND BINDING DEVICE  
Filed July 11, 1922  3 Sheets-Sheet 3
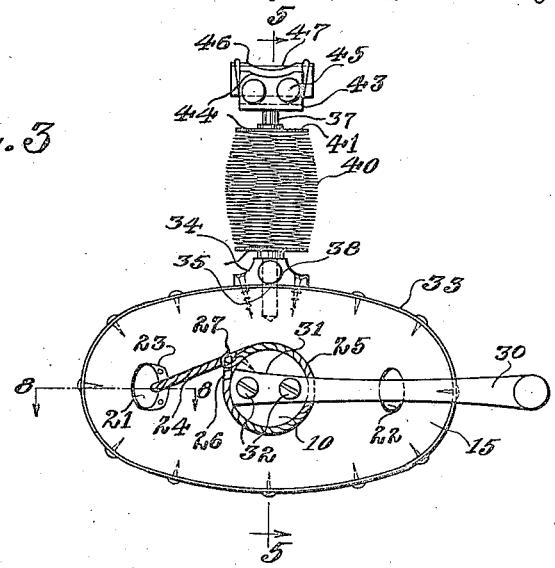
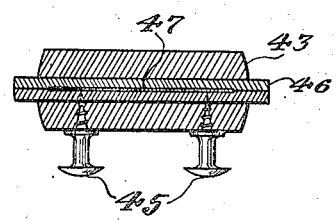
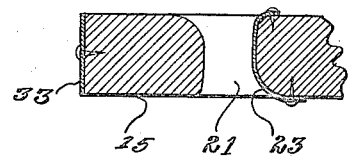
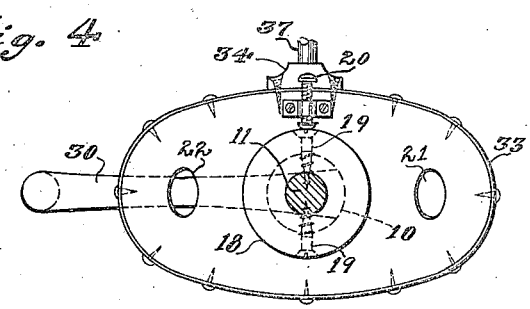
INVENTOR  
John F. Patterson.  
WITNESSES:  
BY Joshua R. H. Potts,  
HIS ATTORNEY Patented July 24, 1923.

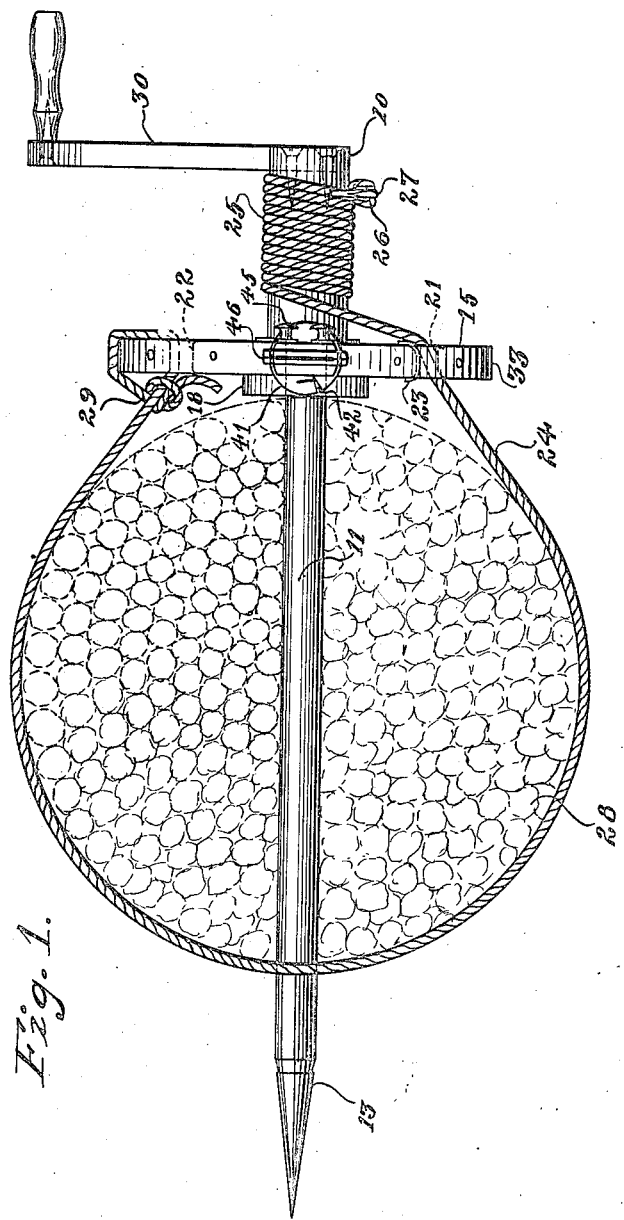

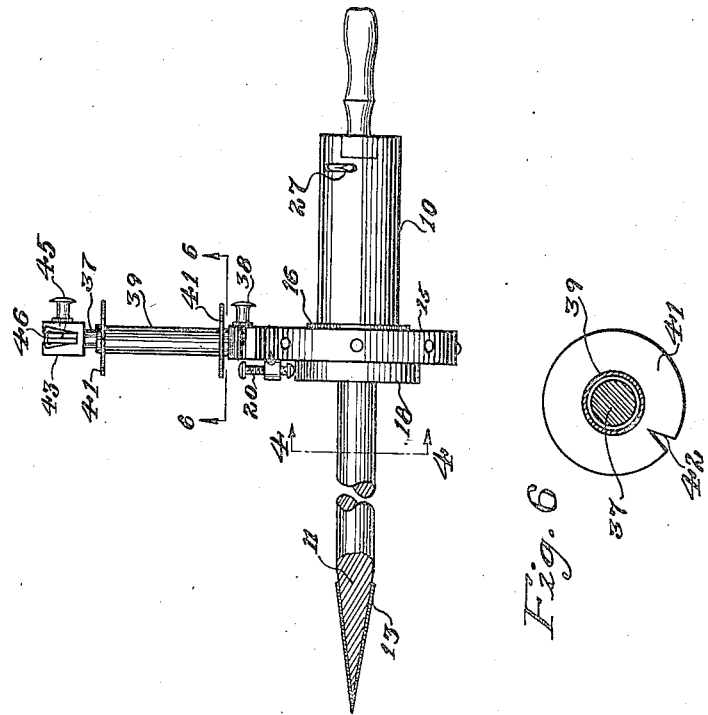

1,462,817

UNITED STATES PATENT OFFICE.

JOHN F. PATTERSON, OF MERCHANTVILLE, NEW JERSEY.

SHOCK COMPRESSING AND BINDING DEVICE.

Application filed July 11, 1922. Serial No. 574,226.

*To all whom it may concern:*

Be it known that I, JOHN F. PATTERSON, a citizen of the United States, residing at Merchantville, in the county of Camden and State of New Jersey, have invented certain new and useful Improvements in Shock Compressing and Binding Devices, of which the following is a specification.

My invention relates to harvesting appliances and more particularly to shock compressing and binding devices.

The object of the invention is to provide an improved device of the above character by which shocks of corn or the like may be quickly compressed into compact form preliminary to being bound and tied, the device including a tension and take-up device and a twine holder and cutter.

These objects, and other advantageous ends which will be described hereinafter, I attain in the following manner, reference being had to the accompanying drawings in which—

Figure 1 is a plan view,

Figure 2 is a side view, partly broken away,

Figure 3 is a front elevation,

Figure 4 is a sectional elevation taken on the line 4—4 of Figure 2,

Figure 5 is an enlarged fragmentary vertical sectional view, taken on the line 5—5 of Figure 3, Figure 6 is a sectional view taken on the line 6—6 of Figure 2, Figure 7 is an enlarged sectional view taken on the line 7—7 of Figure 5, and Figure 8 is an enlarged fragmentary horizontal sectional view taken on the line 8—8 of Figure 3.

In the drawings, the improved device is shown as comprising a drum 10 having a spear 11 projecting axially therefrom having a tapered end 12, and, if made of wood, preferably provided with a metallic covering 13. The shoulder 14 at the inner end of the drum rotatably engages a flanged sleeve 16 mounted in an opening in a member such as a breast plate 15. A sleeve 17 fixed to the shank of the spear extends through the sleeve and is rotatable therein.

The drum 10, spear 11 and sleeve 17 are rotatable relatively to sleeve 16 and the breast plate. Sleeve 17 extends beyond sleeve 16 and carries a set collar 18 which is held by set screws 19 which extend through the collar and sleeve 17 and into spear 11. A cushion or friction brake member or stop screw 20 is mounted vertically on breast plate 15 over collar 18 and engages the periphery of the collar to restrain the spear and drum from turning.

Breast plate 15 is provided with openings 21 and 22 on opposite sides of drum 10; opening 21 has rounded walls and a wear plate 23 is fixed to the inner wall for free sliding contact with a cord or rope 24. The rope is wound on drum 10 as indicated at 25, and provided with a loop 26 at one end to anchor it to the drum by engagement with a hook 27. The other end of the rope extends through opening 21 and is adapted to be passed around the shock of grain or other material to be compressed and bound, as indicated at 28, while its free end is anchored to the breast plate upon the opposite side of the drum through the opening 22, by a knotted loop 29 or other suitable means. In order to rotate the drum, a crank handle 30 is provided, the drum in the construction shown being provided with a diametrical end recess 31 in which the crank is secured as indicated at 32.

Breast plate 15 is provided with a peripheral protector band or rim 33, the ends of which are anchored beneath a bearing bracket 34 as indicated at 35. Breast plate 15 is provided with a socket 36 at its top, aligning with an aperture in bearing bracket 34, to receive a pin 37 which is held in position by a set screw 38. This pin rotatably supports a spool or bobbin 39 on which twine 40 is wound, the heads 41 of the spool having kerfs 42, one to hold an end of the twine and the other to hold the free end when not in use. Heads 41 are spaced from the ends of the tubular portion of the spool to rotatably support the spool upon either end, while maintaining the heads 41 out of contact with the bracket.

A twine cutter is secured to the upper end of pin 37. It consists of a slotted block 43 providing spaced jaws with concaved upper edges 44. A holder 46 carrying a blade 47 is slidably mounted in the slot of block 43 and is held from endwise displacement, but may be secured in any desired vertical position by set screws 45. When the blade holder is lowered, the cutting edge of blade 47 will be disposed beneath edges 44 and out of cutting position. The top edges of blade holder 46 are concaved or recessed to expose the central portion of the blade edge for use, when the holder is raised as shown in Figures 3 and 5 of the drawings.

In use of the device, the twine cutter is raised or adjusted to cutting position. The operator then grasps the breast plate and drum and forces the pointed end of spear 11 through the shock or other material to be compressed and bound, as shown in Figure 1 of the drawings. During this time the twine holder and cutter are in an upright position. The rope 24 is then unwound from drum 10, the drum and spear being free to turn in the breast plate. The rope is passed through opening 21, around the shock above the spear and then fastened at the free end through opening 22. The crank handle 30 is then operated to turn the drum and wind the rope thereon, thus taking up slack in the rope and compressing the shock into compact form. The brake member 20 is then turned to engage the set collar 18 and prevent reverse rotation of the drum and prevent the rope from unwinding. The shock is held in this compressed position and while so held, the operator takes the necessary twine from the spool 39 and binds the shock, the twine being cut the necessary length by cutter or blade 47. The ends of the twine are held in the kerfs 42 to prevent unwinding thereof. When the shock is bound and the ends of the twine tied together, the brake 20 is released so that the rope 25 is slackened, the end thereof untied from the breast plate at opening 22 and then the rope may be wound on the drum, by turning the crank handle 30. The device is withdrawn from the shock and the latter left standing properly bound to resist being blown over.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A binding device including a spear having means providing a drum; a member rotatably mounted on said spear; a cord cooperating with said drum and said member to provide binding means; and an adjustable friction brake carried by said member and arranged to bear directly upon means connected to said spear to prevent movement between said spear and said member.

2. A binding device including a spear having means providing a drum; a member rotatably mounted on said spear; a cord cooperating with said drum and said member to provide binding means; a bearing collar on said spear; and a friction brake in the form of a set screw adapted to bear upon said collar.

3. A device including a spear, having means providing a drum; a collar secured on said spear and spaced from said drum; a member rotatably mounted between said collar and said drum; a cord cooperating with said drum and said member to provide binding means; and a brake on said member operable to engage said collar.

4. A binding device comprising a spear having means providing a drum; a collar secured on said spear and spaced from said drum; a member rotatably mounted between said collar and said drum; and a set screw mounted on said member and having friction means adapted to engage said collar.

In testimony whereof I have signed my name to this specification in the presence of two subscribing witnesses.

JOHN F. PATTERSON.

Witnesses:
CATHERINE M. COMERFORD,
CHAS. E. POTTS.